Inventor
Stephen Emmitt Allen
By Clarence A. O'Brien
Attorney

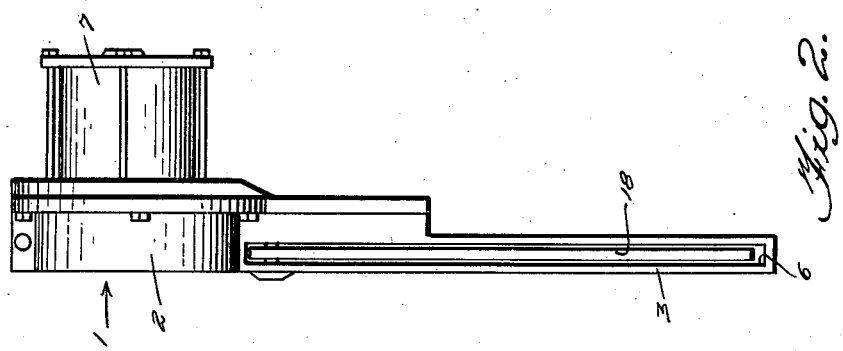
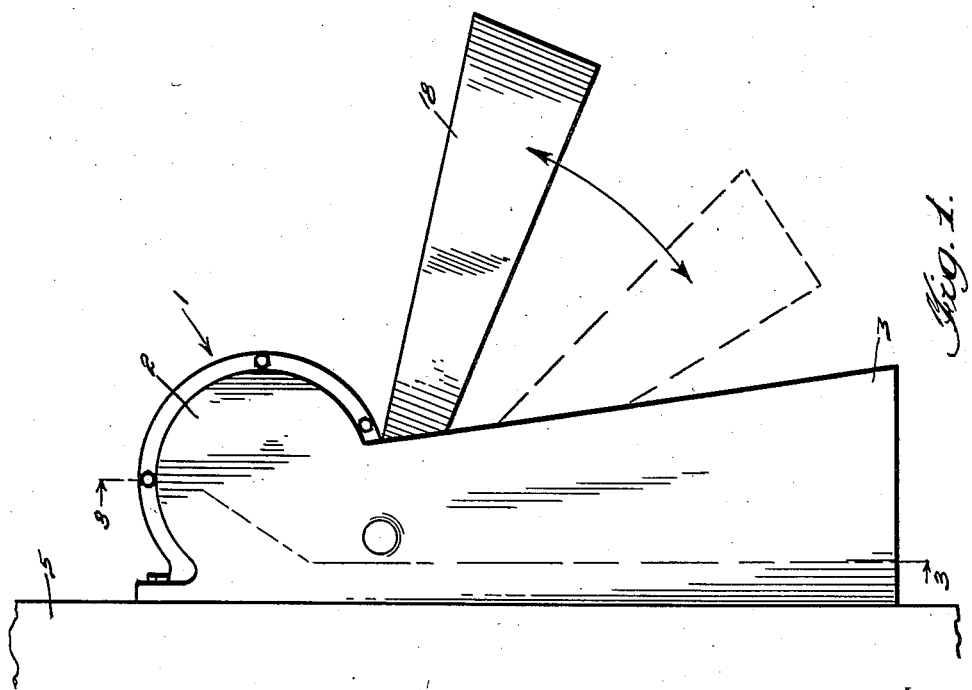
Inventor
Stephen Emmitt Allen
By Clarence A. O'Brien
Attorney Dec. 14, 1943.   S. E. ALLEN   2,336,451
SAFETY SIGNAL
Filed March 6, 1941   2 Sheets-Sheet 2

Patented Dec. 14, 1943

2,336,451

UNITED STATES PATENT OFFICE 2,336,451

SAFETY SIGNAL

Stephen Emmitt Allen, El Centro, Calif.

Application March 6, 1941, Serial No. 382,073

1 Claim. (Cl. 177—329)

The present invention relates to new and useful improvements in safety signals for motor vehicles, particularly buses and has for its primary object to provide, in a manner as hereinafter set forth, a device of this character which is adapted to be expeditiously installed for operation on the rear of a bus for warning the operators of approaching vehicles and others that passengers are being loaded or unloaded.

Another very important object of the invention is to provide a safety vehicle signal of the aforementioned character comprising a motor driven oscillating arm for attracting attention thereto, the motor being under the control of the operator of the vehicle.

Other objects of the invention are to provide a vehicle safety signal of the character described which will be comparatively simple in construction, strong, durable, highly efficient and reliable in use, compact, attactive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of a safety signal constructed in accordance with the present invention, showing the device mounted on the body of a bus with the signaling arm in operation.

Figure 2 is an elevational view, looking at the outer side of the device.

Figures 3, 4:
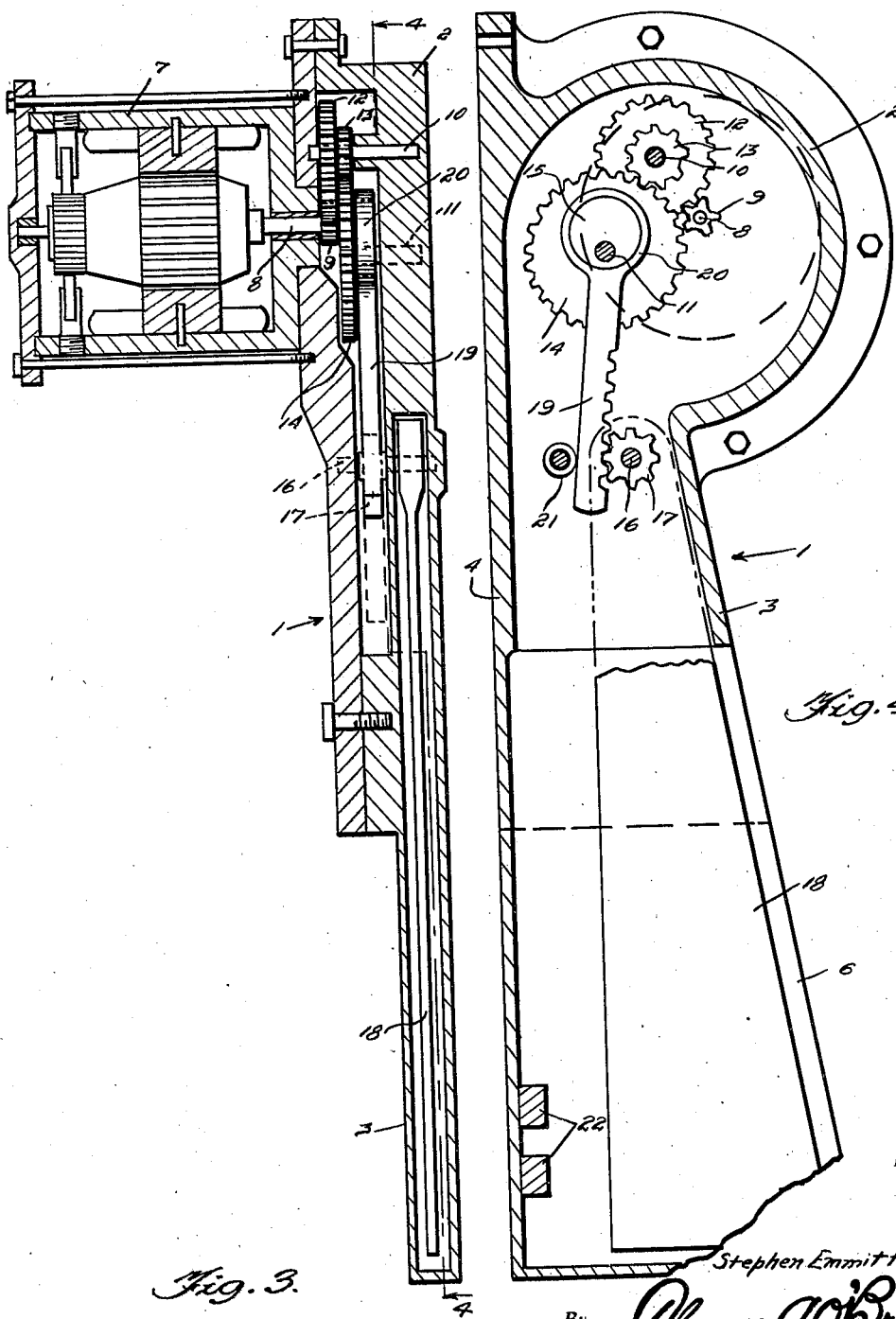
Figure 3 is a vertical sectional view, taken substantially on the line 3—3 of Figure 1.
Figure 4 is a vertical sectional view, taken substantially on the line 4—4 of Figure 3.

Referring now to the drawings in detail, it will be seen that the embodiment of the invention which has been illustrated comprises a housing or casing of suitable material which is designated generally by the reference numeral 1. The casing 1 includes a substantially segmental, flat upper portion 2 and a lower portion 3 of the shape shown to advantage in Figures 1 and 2 of the drawings. The casing 1 further includes a flat, vertical inner side wall 4 for abutting a body 5 of the vehicle, to which said casing 1 is firmly secured in any suitable manner. The outer side of the lower portion 3 of the casing 1 is formed to provide a narrow, vertically elongated opening 6 the purpose of which will be presently set forth.

Mounted on the back of the upper portion 2 of the casing 1 is an electric motor 7. The motor 7 is to receive electric current from the usual storage battery of the vehicle. A suitable switch for controlling the electric motor 7 is to be provided within convenient reach of the operator of the vehicle.

The shaft 8 of the electric motor 7 extends into the upper portion 2 of the housing 1 and has fixed thereon a gear 9. Journaled in the upper portion 2 of the housing 1 are parallel shafts 10 and 11. Fixed to the shaft 10, on one side of the gear 12, is a comparatively small gear 13. The gear 13 meshes with and drives a comparatively large gear 14 which is fixed to the shaft 11. Also fixed to the shaft 11, on one side of the gear 14, is an eccentric 15.

Journaled in the upper part of the portion 3 of the housing 1 is a shaft 16 having fixed thereon a gear 17. Also fixed on the shaft 16 is a signalling arm 18 which, when inoperative, is suspended in the lower portion 3 of the housing 1. A rack bar 19 meshes with the gear 17 and is provided on its upper end with a follower 20 which is journaled on the eccentric 15. A guide 21 in the housing 1 retains the rack bar 19 in engagement with the gear 17.

It is thought that the operation of the device will be readily apparent from a consideration of the foregoing. Briefly, when the electric motor 7 is energized the eccentric 15 is actuated by the shafts 8, 10 and 11 and the train of gears thereon. In this manner the rack bar 19 is actuated for rotating the gear 17 with the shaft 16 alternately in opposite directions. Thus, the arm 18 is swung out of the lower portion 3 of the housing 1 and oscillated substantially in the manner suggested in Figure 1 of the drawings. As will be readily apparent, the oscillation of the signal arm 18 attracts attention thereto. The arm 18 swings into and out of the lower portion 3 of the housing 1 through the opening 6. Suitable bumpers 22 are provided in the lower portion of the housing 1 for cushioning the arm 18 when it returns to inoperative position. The arm 18 may be provided with any suitable indicia, such as the word "Stop."

It is believed that the many advantages of a safety signal constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A signalling device comprising a substantially flat housing having a slot in one edge, a shaft transversely in the inner end of the slot having a signal secured thereto for swinging outwardly of the slot, a closed chamber in one side of the housing, said shaft projecting into the chamber, a motor housing secured to the outer side of the first-named housing adjacent the chamber, a motor enclosed in the motor housing and also having a shaft projecting into the chamber, and an operating connection between the first and second shafts enclosed in the chamber for oscillating the signal.

STEPHEN EMMITT ALLEN.